United States Patent
Reimer et al.

(10) Patent No.: US 11,217,848 B2
(45) Date of Patent: Jan. 4, 2022

(54) BATTERY MODULE, BATTERY PACK CONTAINING SAME, AND USE THEREOF

(71) Applicant: Robert Bosch GmbH, Stuttgart (DE)

(72) Inventors: Eduard Reimer, Fellbach (DE); Matthias Oechsle, Ditzingen-Hirschlanden (DE); Seref Aktuerk, Karben (DE); Thomas Dittert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 16/257,246

(22) Filed: Jan. 25, 2019

(65) Prior Publication Data
US 2019/0237721 A1 Aug. 1, 2019

(30) Foreign Application Priority Data
Jan. 30, 2018 (DE) ...................... 10 2018 201 375.6

(51) Int. Cl.
*H01M 50/20* (2021.01)
*H01M 50/502* (2021.01)
*H01M 10/42* (2006.01)

(52) U.S. Cl.
CPC ......... *H01M 50/20* (2021.01); *H01M 10/425* (2013.01); *H01M 50/502* (2021.01); *H01M 2010/4278* (2013.01); *H01M 2220/20* (2013.01)

(58) Field of Classification Search
CPC .. H01M 2/1077; H01M 2/206; H01M 10/425; H01M 2010/4278; H01M 2220/20
See application file for complete search history.

(56) References Cited

U.S. PATENT DOCUMENTS

| | | | |
|---|---|---|---|
| 3,510,978 A | 5/1970 | Murdock | |
| 7,604,507 B1 | 10/2009 | Millon | |
| 9,433,113 B2* | 8/2016 | Takeno | B60L 53/22 |
| 2002/0085403 A1* | 7/2002 | Cho | H01M 50/20 |
| | | | 363/146 |
| 2009/0129044 A1 | 5/2009 | Tsuchiya et al. | |
| 2013/0183562 A1* | 7/2013 | Workman | H01M 50/502 |
| | | | 429/100 |
| 2014/0167502 A1* | 6/2014 | Lopez | H02J 7/0047 |
| | | | 307/18 |
| 2019/0221793 A1* | 7/2019 | Krueger | H01M 2/206 |

FOREIGN PATENT DOCUMENTS

| | | |
|---|---|---|
| DE | 102013009713 | 12/2014 |
| JP | 2014060044 A * | 4/2014 |
| WO | 2011078478 | 6/2011 |

* cited by examiner

*Primary Examiner* — Sarah A. Slifka
*Assistant Examiner* — Patrick Marshall Greene
(74) *Attorney, Agent, or Firm* — Michael Best & Friedrich LLP

(57) ABSTRACT

A battery module comprising a plurality or a multiplicity of battery cells which are positioned in a battery module housing, wherein the battery module housing comprises side walls (12), a base surface and a battery module cover (14), wherein the battery module cover (14) comprises at least one terminal (16) for the current-carrying or data-conducting contacting of the battery module (10), wherein the terminal (16) is provided with a current-carrying or data-conducting cable (26), and wherein the battery module cover (14) comprises a device (28) for the coiling of said current-carrying or data-conducting cable (26).

20 Claims, 1 Drawing Sheet

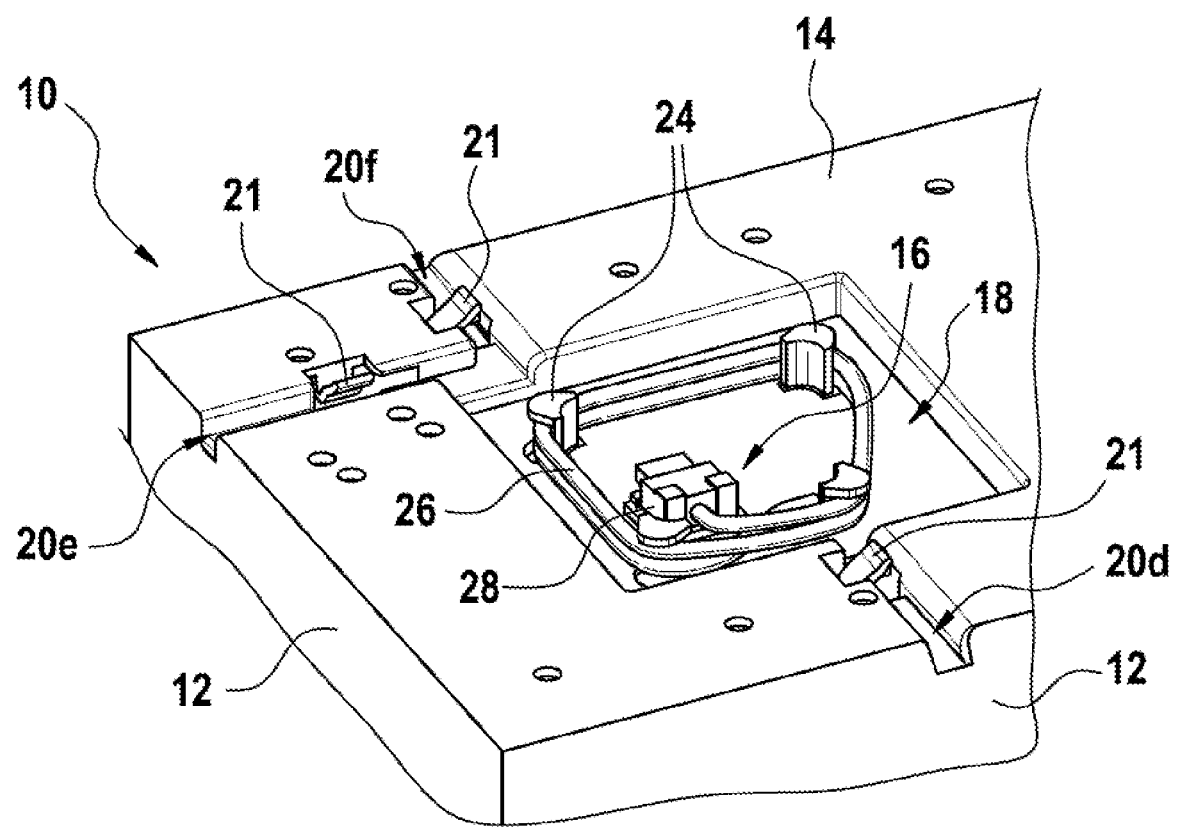

BATTERY MODULE, BATTERY PACK CONTAINING SAME, AND USE THEREOF

BACKGROUND OF THE INVENTION

The present invention relates to a battery module, a battery pack containing same, and the use thereof.

In hybrid, plug-in hybrid and electric vehicles, electrical energy stores are used in order to store the requisite energy for an electric motor, which either supports the driving mechanism or constitutes the driving mechanism itself. Electrical energy stores of this type are configured, for example, in the form of lithium-ion batteries, which contain a multiplicity of individual battery cells which, in turn, are mutually interconnected in series or in parallel in a plurality of battery modules. Consequently, there is a requirement for the mutual electrical interconnection of the various battery modules in a battery which, under certain circumstances, can also be achieved by means of a hard-wired solution.

Electrical energy stores of this type additionally require a sophisticated system for the monitoring of the battery modules or of the battery cells contained therein. Customarily, for example, corresponding battery modules, or battery packs comprised of a plurality of battery modules, respectively comprise cell monitoring units, also described as cell supervision circuits (CSC). The cell monitoring units of the various battery modules or battery packs in the same electrical energy store are thus connected in a data-conductive manner which, in many cases, is also achieved by means of a hard-wired arrangement.

Customarily, electrical energy stores of this type further comprise a central battery control device which, for example, is arranged in data-conductive contact with various cell monitoring units, or directly with the battery modules or battery packs of the electrical energy store. This is likewise achieved by means of corresponding cable connections. As both the positioning of the battery control device and of the cell monitoring units is variable, and the number of battery modules and battery packs within an electrical energy store, and thus the positioning thereof within the electrical energy store, are also variable, cables of different lengths are required for the corresponding number of cable connections. Accordingly, for the production of corresponding electrical energy stores, a multiplicity of cables of different lengths are required, the provision of which is complex, and is also potentially error-prone. Moreover, a set of connecting cables of this type, having predefined lengths, restricts the positioning options for control devices and battery modules within the electrical energy store.

In this regard, a battery for a hybrid or electric vehicle having a cable duct for the accommodation of a cable harness is known from DE 10 2013 009 713 A1. This cable duct incorporates mounting aids, into which a corresponding cable can be clipped, such that the latter is securely fastened in place. From US 2009/0129044 A1, a structure is additionally known for the guidance of a cable duct on a battery housing. The cable can thus be routed on the outer side of a battery housing.

Moreover, U.S. Pat. No. 7,604,507 B1 discloses a cable which is routed along the exterior of a battery module wherein, for the guidance of the cable, clip fittings are provided. In addition, from WO 2011/078478 A2, a battery management system for a high-voltage battery of a hybrid vehicle is known, the modules of which are interconnected by means of cables.

SUMMARY OF THE INVENTION

According to the invention, a battery module, a battery pack containing same, and uses thereof, are provided.

The battery module according to the invention comprises a plurality or a multiplicity of battery cells such as, for example, lithium-ion battery cells, which are electrically connected to one another, for example, in series or in parallel. These are positioned in a battery module housing, wherein the battery module housing comprises side walls, a base surface and a battery module cover. The battery module housing additionally comprises at least one terminal, for example for a current-carrying cable, for the electrical connection of the battery module to a further battery module or to a battery terminal of an electrical energy store which incorporates the battery module according to the invention. The terminal can also be used for the contacting of a data-conducting cable, wherein the battery module is connected, for example, to a battery control device, a cell monitoring unit or a cell contacting unit in a data-conducting manner. Specifically, the battery module cover is configured such that the latter incorporates the terminal for the connection of a current-carrying or data-conducting cable or connecting cable.

According to the invention it is provided that, on the battery module cover, specifically in the region of the terminal, a device is arranged for the coiling of a current-carrying or data-conducting cable, which is connected, for example, to the terminal. This arrangement has a particular advantage in that a corresponding current-carrying or data-conducting cable can be connected to the terminal of the battery module cover at an early stage of manufacture, and then, by means of the coiling device, such a cable can be coiled, and thus protected against damage during the remainder of the manufacturing process. Moreover, the coiled state of such a cable simplifies further production steps, for example during the fitting of a battery module of this type within a battery pack.

Further advantageous forms of embodiment of the present invention are the subject matter of the sub-claims.

It is thus advantageous if the device for the coiling of a current-carrying or data-conducting cable is constituted in the form of at least two, specifically four projections on the battery module cover, which project beyond the latter in the vertical direction. It is particularly advantageous if said projections incorporate an extended head area, specifically an extended cross-section in the head area. The function of the projections is the take-up of the coiled current-carrying or data-conducting cable, and the extended head areas prevent any disengagement of the coiled cable from the projections.

According to a particularly advantageous form of embodiment of the present invention, both the terminal for, and the device for the coiling of, a current-carrying or data-conducting cable are arranged in a recess in the battery module cover. This is particularly advantageous if the recess is dimensioned such that the terminal, or the projections which constitute the device for the coiling of a current-carrying or data-conducting cable, do not protrude beyond the surface of the battery module cover. This permits the flush-mounting of a battery module which is configured in this manner, for example in physical contact with other battery modules, and prevents any mechanical effects upon protruding projections in the course of manufacture, and thus any potential damage resulting therefrom.

It is further advantageous if the battery module comprises at least three cable guides, in order to permit the attachment of a current-carrying or data-conducting cable of this type. A cable guide is to be understood as a cable guideway, either within or on an inner or outer wall of the battery module housing which, either continuously or at regular intervals, incorporates means for the attachment of a cable which is to be routed therein.

It is provided that the length of this cable guide, i.e. the distance from the connecting point to the end point thereof at the periphery of the battery module, is configured such that the sum of a respective first cable guide length of a respective first cable guide and a respective second cable guide length of a respective second cable guide is constant, for at least three cable guides.

This means, for example, that the sum of the first cable guide length and the second cable guide length is exactly equal to the sum of the first cable guide length and the third cable guide length. Alternatively, the sum of the first cable guide length and the second cable guide length is also exactly equal to the sum of the second cable guide length and the third cable guide length.

This arrangement has a particular advantage in that, with the use of a plurality of identically configured battery modules and the positioning of said identically configured battery modules such that the end points of the respective cable guides on the periphery of a first and second battery module are arranged with the smallest possible mutual clearance, the length of a cable which connects a first connecting point of a first battery module to a second connecting point of a second battery module is equal for all the potential positioning options of the two battery modules in relation to each other.

In this manner, for each of the selected positioning options, a cable of equal length can be used such that, in the context of the construction of a battery pack comprised of a plurality of battery modules, only cables of the same length are required, and the provision of cables of different lengths can be omitted. In this case, with respect to the length of the cable to be used, it is not critical, for example, whether a data-conducting or current-carrying cable connection is to be constituted between the first and second battery modules via the first, second or, where applicable, third cable guide of the first or second battery modules. Moreover, this cable connection can also be executed via any desired combination of the first to third cable guides of the first battery module to the first to third cable guide of the second battery module: in all cases, the same cable lengths are required for a corresponding data-conducting or current-carrying cable from the connecting point of the first battery module to the connecting point of the second battery module.

Specifically, the concept of the cable guide length is defined such that, in addition to first length segments of a current-carrying or data-conducting cable, which are routed in a cable guide, for example in the form of a cable duct, it further incorporates second length segments of a cable which is to be routed, which are secured by the take-up of the cable on the device for the coiling of the current-carrying or data-conducting cable, to constitute the resulting cable coil. The second length segments thus essentially constitute a whole-number multiple of the cable length which is secured per turn, as a corresponding cable can also be wound in more than one turn onto the device for the coiling of the current-carrying or data-conducting cable.

This means that the corresponding cable, for example, has an overall cable length which is divided into a first length segment, which is routed in one or more cable ducts of the battery module or battery module cover, and a second length segment, which is carried on a device for the coiling of a current-carrying or data-conducting cable.

It is further advantageous if a continuous fixing is provided, for example by the provision of a corresponding cable duct. Alternatively, an intermittent attachment arrangement for the routing of a cable, for example by means of corresponding retaining clips, is possible. Naturally, a combination of these two implementation options is also possible, in the form of a cable duct which incorporates retaining clips. The at least three cable guides of the battery module respectively originate at the terminal for a data-conducting or current-carrying cable, and terminate at an appropriate and selectable point on the periphery of the battery module, which is spaced from said terminal.

It is moreover advantageous if the cable guides are configured as cable ducts which, for example, are impressed into an outer surface of the battery module housing. This form of embodiment has an advantage in that the installation of current-carrying or data-conducting cables can be executed on the outer surface of the battery module, with the battery module housing in a closed state, and greater security in the handling of such a battery module is thus provided accordingly. If corresponding cables are routed in cable ducts which are impressed into the surface of the battery module housing, the arrangement of corresponding cables on the surface of the battery module housing, rather than increasing the space required for said battery module housing within an electrical energy store, permits a plurality of battery modules to be positioned next to one another, such that the battery module housings thereof are in mutual physical contact.

According to a further form of embodiment of the present invention, a battery module is provided, having a plurality of battery cells which are mutually electrically contacted, in parallel or in series, and having a battery module housing provided which incorporates at least two connecting points for a data-conducting or current-carrying cable, and at least four cable guides for the routing of a data-conducting or current-carrying cable, which is connected to the connecting points, to a further battery module or data receiver, wherein the cable guides terminate at outer edges of the battery module housing. Each of the cable guides has a cable guide length, which commences at one of the connecting points and terminates at an outer edge of the battery module housing.

The sum of a cable guide length of a first cable guide, commencing at a first connecting point and terminating at a first outer edge of the battery module housing, and the cable guide length of a second cable guide, commencing at a second connecting point and likewise terminating at the first outer edge of the battery module housing, is thus equal to the sum of a cable guide length of a third cable guide, commencing at a first connecting point and terminating at an outer edge of the battery module housing which is arranged opposite said first outer edge, and a cable guide length of a fourth cable guide, commencing at the second connecting point and likewise terminating at the outer edge of the battery module housing which is arranged opposite said first outer edge.

This arrangement has a particular advantage in that, with the use of a plurality of identically configured battery modules and a positioning of said identically configured battery modules in relation to one another such that the positions of the terminal points of the respective cable guides on the periphery of a first and a second battery module are configured with the smallest possible mutual clearance, the length of a cable which connects a first connecting point of a first battery module to a second connecting point of a second battery module is equal for a plurality, and specifically for all the positioning options for the two battery modules in relation to one another. In this manner, for each of the selected positioning options for the first and second battery modules in relation to one another, a cable of equal length can be used, such that the use of cables of different lengths in the context of the construction of such a battery pack, comprised of a plurality of battery modules, can be omitted.

In this case, it is not critical to the length of cable to be used whether, for example, a data-conducting or current-carrying cable connection is to be established between the first and second battery modules, and via which cable guides said connection is to be executed. Moreover, this cable connection can also be executed via any desired combination of cable guides on a first and a second battery module: in all cases, the same cable lengths are required for a corresponding data-conducting or current-carrying cable from a first connecting point on the first battery module to a second connecting point on the second battery module.

A further object of the invention is a battery pack, which comprises a plurality of battery modules. Although an electrical energy store can incorporate a plurality of battery packs, it is also possible for an electrical energy store to be constituted by a single battery pack, comprising a plurality of battery modules. A battery pack of this type comprises a plurality or a multiplicity of battery modules which, in turn, comprise a plurality or multiplicity of battery cells. The battery cells of a battery module are mutually electrically interconnected in series or in parallel. The battery modules respectively comprise a battery module housing, on which at least one connecting point for a data-conducting or current-carrying cable is located. The battery modules further comprise cable guides, which originate at the respective connecting point of a battery module and terminate at an end point on the outer periphery of said battery module. At least one of the battery modules comprises at least three cable guides. If a minimum of three battery modules are arranged adjacently to one another, it is provided, according to the invention, that a first cable which, for example, connects a first connecting point on a first battery module to a second connecting point on a second battery module in a data-conducting or current-carrying manner, and which is routed in cable guides of the first and second battery modules, is of equal length to a second current-carrying or data-conducting cable, which connects the second connecting point on the second battery module to a third connecting point on the third battery module in a data-conducting or current-carrying manner.

This arrangement has a particular advantage in that, independently of the positioning of corresponding battery modules which, specifically in their existing form, are configured to an identical design, cables having a comparable length can be used in all cases, thereby significantly simplifying the manufacture of a corresponding battery pack.

The battery module according to the invention or the battery pack according to the invention can advantageously be used in motor vehicle applications such as, for example, electric or hybrid vehicles, in portable data processing or telecommunication devices, in portable electric power tools or in stationary stores, specifically for regeneratively generated electrical energy. Moreover, the battery module or battery pack according to the invention can be of the rechargeable battery type, or can involve a single-use battery.

BRIEF DESCRIPTION OF THE DRAWING

Exemplary forms of embodiment of the present invention are represented in the drawing, and are described in greater detail in the following description of figures. In the drawing:

FIG. 1 shows a perspective view of a battery module according to the invention, according to a first form of embodiment of the present invention.

DETAILED DESCRIPTION

FIG. 1 represents a battery module 10 according to a first form of embodiment of the present invention. The battery module 10 comprises battery cells, which are not represented in FIG. 1, and which, for example, are mutually electrically interconnected in series or in parallel. The battery module 10 comprises a battery module housing, which comprises side walls 12 and a housing cover 14. The housing cover 14 incorporates, for example, a first connecting point 16 which, for example, is used for the electrical contacting of the battery module 10 or for the datalink contacting of the battery module 10. Datalink contacting is present, for example, if measuring signals, for example from sensors which are installed in the battery module, can be transmitted via the connecting point 16, or where the connecting point 16 is in electrical contact with measurement lines which, in turn, are connected to individual battery cells of the battery module 10. The first connecting point 16 is preferably positioned in a recess 18 in the housing cover 14.

In order to ensure an electrical or datalink contacting of the battery module 14 via the first connecting point 16, the battery module 10 comprises at least three, and preferably between four and six cable guides 20d, 20e, 20f, the function of which is the attachment of a current-carrying or data-conducting cable 26. The cable guides 20d-20f connect the first connecting point 16, preferably to different outer edges of the housing cover 14, and thus terminate in the outer periphery of the housing cover 14. Thus, in FIG. 1, for example, a first cable guide 20d terminates at a first longitudinal edge of the battery module 10, a second cable guide 20e terminates at second outer edge of the housing cover 14, and a third cable guide 20f terminates at a second longitudinal edge of the housing cover 14, which lies opposite the first longitudinal edge of the housing cover 14.

The cable guides 20d-20f are preferably configured as channels in the housing cover 14. This form of embodiment has an advantage in that, upon the contacting of the first connecting point 16 by means of a corresponding cable, said cable can be routed in the constituent channels of the cable guides 20d-20f, and the contacted battery module 10 thus occupies no more space than a battery module 10 which is not contacted. Moreover, this permits the flush-fitting of a plurality of battery modules 10 in a directly adjoining structural arrangement.

In the recess 18 of the first connecting point 16, fixing means 24 are provided, which permit the coiling of a corresponding cable 26 within the recess 18. The cable 26 comprises, for example, a terminal plug 28, by means of which the cable 26 can be attached, for example, to a first connecting point of an adjoining battery module 10.

The cable guides 20d-20f further incorporate, for example, retaining clips 21, which permit the attachment of corresponding cables within the cable guides 20c-20f.

Preferably, in addition to a first connecting point 16, the battery module 10 comprises a further connecting point, which is not represented in FIG. 1. The first connecting point 16 comprises first cable guides 20d to 20f, and the second connecting point comprises second cable guides. In principle, the sum of the length of the first cable guide 20c, which connects the first connecting point 16 to an outer side of the battery module cover 14, and the length of a second cable guide, which connects the second connecting point to an edge of the housing cover 14 arranged opposite the first outer edge of the housing cover 14, is equal to the sum of the length of a further first cable guide 20e, which connects the first connecting point 16 to an outer edge of the housing cover 14, and the length of a further second cable guide, which connects the second connecting point to an outer edge of the housing cover 14 arranged opposite the first outer edge. These sums, in turn, are preferably equal to the sum of the length of a third first cable guide 20f, which connects the first connecting point 16 to an outer edge of the housing cover 14, and the length of a third second cable guide, which connects the second connecting point to an outer edge of the housing cover 14 which is arranged opposite the first outer edge.

Upon the assembly of a plurality of battery modules 10 to constitute a battery pack, which is not represented, it proceeds that the length of a cable 26, which connects a first connecting point 16 of a first battery module 10 to a second connecting point of an unrepresented and adjoining further battery module is identical to the length of a cable 26, which connects a second connecting point of the first battery module 10 to a first connecting point of an adjoining second battery module. In this manner, a plurality or a multiplicity of specifically identically configured battery modules 10 can be grouped, for example in a horizontal arrangement, and can be connected to one another by means of a single cable length, in a current-carrying or signal-conducting manner.

Additionally or alternatively, it is possible for specifically equivalently configured battery modules 10, rather than in a horizontal plane, to be additionally or alternatively arranged in a vertical plane. To this end, the cable guides 20d-20f, alternatively or additionally, are routed in outer walls or in the floor region of the module housing of the battery module 10. Here again, they are preferably configured in the form of channels in the housing wall or in the base of the housing. This form of embodiment permits the cubic arrangement of a multiplicity of battery modules to constitute a corresponding battery pack.

What is claimed is:

1. A battery module comprising a plurality of battery cells which are positioned in a battery module housing, wherein the battery module housing comprises side walls (12), a base surface and a battery module cover (14), wherein the battery module cover (14) comprises at least one terminal (16) for the current-carrying or data-conducting contacting of the battery module (10), the at least one terminal (16) is configured to receive a terminal plug from another battery module, characterized in that the battery module cover (14) further comprises a current-carrying or data-conducting cable (26) having a terminal plug (28) configured to plug into a terminal of another battery module, the battery module cover (14) also comprising a device for the coiling of the current-carrying or data-conducting cable (26) such that, when the current-carrying or data-conducting cable (26) is coiled around the device, the current-carrying or data-conducting cable (26) terminates at the at least one terminal (16) so that the terminal plug (28) of the battery module cover (14) is insertable into the at least one terminal (16) of the battery module cover (14).

2. The battery module according to claim 1, characterized in that the device for the coiling of a current-carrying or data-conducting cable comprises at least two projections (24) which project from the surface of the battery module cover (14) in a vertical direction in relation to said surface.

3. The battery module according to claim 1, characterized in that the terminal (16) for a current-carrying or data-conducting cable (26) and the device for the coiling of a current-carrying or data-conducting cable are arranged in a recess (18) in the battery module cover (14).

4. The battery module according to claim 1, characterized in that at least three cable guides (20d-20f) are provided for the routing of a data-conducting or current-carrying cable, which is connected to the terminal (16) for the current-carrying or data-conducting contacting of the battery module (10), to a further battery module or data receiver, wherein each of the cable guides (20d-20f) has a cable guide length which originates at the terminal (16) for the current-carrying or data-conducting contacting of the battery module (10) and terminates at an outer periphery of the battery module housing (14), wherein the sum of a respective first cable guide length of a first cable guide (20d) and a second cable guide length of a second cable guide (20e) is exactly equal to the sum of the first cable guide length of the first cable guide (20d) and a third cable guide length of a third cable guide (20f).

5. The battery module according to claim 1, comprising at least two terminals (16) for a data-conducting or current-carrying cable (26) and at least four cable guides for the routing of a data-conducting or current-carrying cable (26), which is connected to the terminals (16), to a further battery module or data receiver, wherein the cable guides terminate at outer edges of the battery module housing, each of the cable guides having a cable guide length which originates at one of the terminals and terminates at an outer edge of the battery module housing, and in that the sum of a cable guide length of a first cable guide (20d) originating at a first terminal (16) and terminating at a first outer edge of the battery module housing and the cable guide length of a second cable guide originating at a second terminal and likewise terminating at the first outer edge of the battery module housing is equal to the sum of a cable guide length of a third cable guide (20f) originating at the first terminal (16) and terminating at an outer edge of the battery module housing which is arranged opposite the first outer edge, and a cable guide length of a fourth cable guide originating at the second connecting point and likewise terminating at the outer edge of the battery module housing which is arranged opposite the first outer edge.

6. The battery module according to claim 4, characterized in that the calculated cable guide length respectively further incorporates length segments of a cable (26) which is to be routed, which are secured by the take-up of the cable (26) on the device for the coiling of the current-carrying or data-conducting cable (26) to form a cable coil of the current-carrying or data-conducting cable (26).

7. The battery module according to claim 4, characterized in that the cable guides (20d-20f) are configured in the form of a cable duct.

8. The battery module according to claim 7, characterized in that the cable duct is impressed into at least one outer surface of the battery module housing.

9. The battery module according to claim 4, characterized in that at least a part of the cable guides (20d-20f), in the plane of the battery module cover (14), are respectively routed to an outer edge of the battery module cover (14).

10. A battery pack having at least three battery modules (10) according to claim 1, characterized in that, in an adjoining arrangement of the battery modules (10), a cable (26) connecting a first terminal (16) of the first battery module (10) to a second terminal of a second battery module and routed in the cable guides (20d-20f) of the first and second battery modules is of equal length to a second data-conducting or current-carrying cable connecting the second terminal of the second battery module to a third terminal of the third battery module and routed in the cable guides of the second and third battery modules.

11. The battery pack having at least two battery modules (10) according to claim 1, characterized in that, in an adjoining arrangement of the battery modules (10), a cable connecting a first terminal (16) of the first battery module (10) to a second terminal of a second battery module and routed in the cable guides (20d-20f) of the first and second battery modules (20) is of equal length to a second data-conducting or current-carrying cable (26) connecting the second terminal of the first battery module (10) to a first terminal of the second battery module and routed in the cable guides (20d-20f) of the first and second battery modules (10).

12. The battery pack having at least two battery modules (10) according to claim 1, characterized in that two first cable guides (20d) terminate at a first outer edge of a battery module cover (14) of a first battery module (10), and two second cable guides terminate at a second outer edge of a battery module cover of a second battery module which adjoins the first outer edge, and in that the sum of the cable guide lengths of the first cable guides (20d), which terminate at the first outer edge, is exactly equal to the sum of the cable guide lengths of the second cable guides, which terminate at the second outer edge.

13. An electrical energy store for motor vehicle applications, comprising a battery module according to claim 1.

14. A portable telecommunication or data processing device, comprising a battery module according to claim 1.

15. A stationary store, comprising a battery module according to claim 1.

16. The battery module according to claim 1, characterized in that the device for the coiling of a current-carrying or data-conducting cable comprises at least two projections (24) which project from the surface of the battery module cover (14) in a vertical direction in relation to said surface, and which incorporate an extended cross-section in the head area.

17. The battery module according to claim 2, characterized in that the terminal (16) for a current-carrying or data-conducting cable (26) and the device for the coiling of a current-carrying or data-conducting cable are arranged in a recess (18) in the battery module cover (14), such that the projections (24) constituting the device for the coiling of a current-carrying or data-conducting cable do not protrude beyond the surface of the battery module cover in a vertical direction in relation to said surface.

18. The battery module according to claim 1, characterized in that the cable guides (20d-20f) are configured in the form of a cable duct, which incorporates fixing means (24) for the clip attachment of a data-conducting or current-carrying cable (26).

19. The battery module according to claim 7, characterized in that the cable duct is impressed into a cover (14) of the battery module housing.

20. A battery module comprising a plurality of battery cells which are positioned in a battery module housing, wherein the battery module housing comprises side walls (12), a base surface and a battery module cover (14), wherein the battery module cover (14) comprises at least one terminal (16) for the current-carrying or data-conducting contacting of the battery module (10), the at least one terminal (16) is configured to receive a terminal plug from another battery module, characterized in that the battery module cover (14) further comprises a current-carrying or data-conducting cable (26) having a terminal plug (28) configured to plug into a terminal of another battery module, the battery module cover (14) also comprising a device for the coiling of the current-carrying or data-conducting cable (26) such that the current-carrying or data-conducting cable (26) terminates at the terminal (16) so that the terminal plug (28) is insertable into the terminal (16), wherein, in an adjoining arrangement of the battery modules (10), a cable (26) connecting a first terminal (16) of the first battery module (10) to a second terminal of a second battery module and routed in cable guides (20d-20f) of the first and second battery modules is of equal length to a second data-conducting or current-carrying cable connecting the second terminal of the second battery module to a third terminal of the third battery module and routed in cable guides of the second and third battery modules, and wherein two first cable guides (20d) terminate at a first outer edge of a battery module cover (14) of the first battery module (10), and two second cable guides terminate at a second outer edge of a battery module cover of the second battery module which adjoins the first outer edge, and in that the sum of the cable guide lengths of the first cable guides (20d), which terminate at the first outer edge, is exactly equal to the sum of the cable guide lengths of the second cable guides, which terminate at the second outer edge.

* * * * *